July 30, 1940.  G. B. WATKINS ET AL  2,209,435
LAMINATED SAFETY GLASS
Filed Nov. 15, 1935
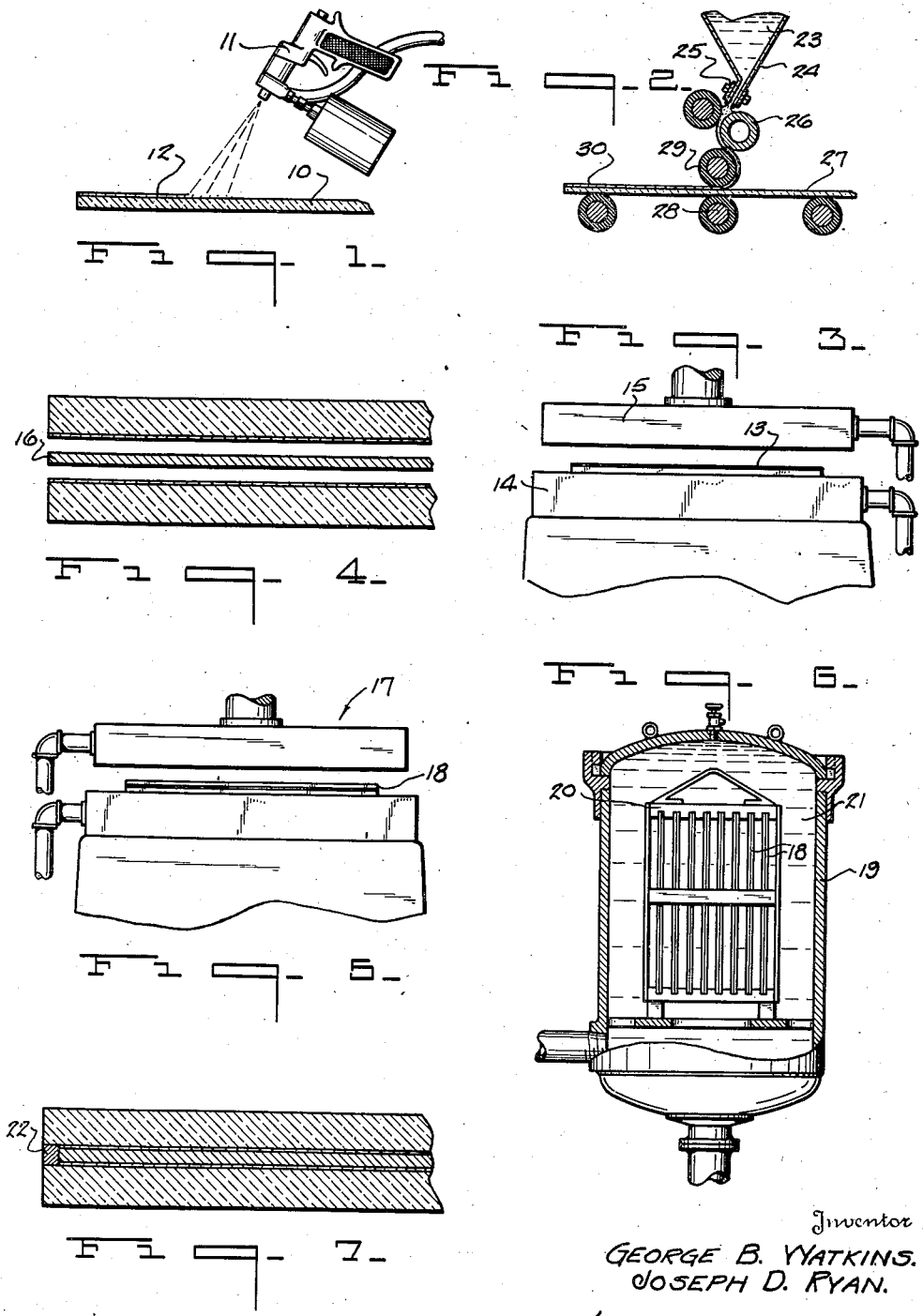
Inventor
GEORGE B. WATKINS.
JOSEPH D. RYAN.
By Frank Fraser
Attorney Patented July 30, 1940

2,209,435

UNITED STATES PATENT OFFICE 2,209,435

LAMINATED SAFETY GLASS

George E. Watkins and Joseph D. Ryan, Toledo, Ohio, assignors to Libbey-Owens-Ford Glass Company, Toledo, Ohio, a corporation of Ohio Application November 15, 1935, Serial No. 49,917

3 Claims. (Cl. 49—92)

The present invention relates to laminated safety glass and more particularly to our discovery of a resinous material capable of serving as a satisfactory adhesive between glass and cellulose acetate plastic laminations.

The problem of bonding a layer of cellulose acetate plastic between two sheets of glass is much more involved than is the case when bonding pyroxylin plastic between glass. While there are almost innumerable adhesives or other bond inducing mediums satisfactory for use between the pyroxylin plastic and glass, there have been but a limited number of mediums capable of giving commercial adhesion between glass and cellulose acetate plastic.

The commercial cellulose acetate plastic available for laminated safety glass manufacture varies from shipment to shipment due primarily to the variations in the raw cellulose acetate employed in its production. In accordance with our invention an adhesive formed from the condensation product of a partially hydrolyzed poly vinyl acetate and formaldehyde is utilized and very satisfactory and consistently dependable results are obtained.

Broadly speaking, we partially hydrolyze poly vinyl acetate and then react it with formaldehyde in the desired proportions, following which plasticizer is added giving an adhesive capable of commercial use in the manufacture of laminated safety glass composed of glass and cellulose acetate plastic laminations.

The adhesive produced in accordance with this invention not only has adhesive properties toward glass but is also sufficiently compatible with the cellulose acetate plastic sheet to give a lamination of good clarity and stability.

In the drawing:

Fig. 1 is a diagrammatic showing of the spraying of our improved adhesive upon a sheet of glass;

Fig. 2 is likewise a diagrammatic showing illustrating the application of the adhesive to the glass by means of a coating machine;

Fig. 3 illustrates the drying of the adhesive film after it has been applied to one surface of a sheet of glass;

Fig. 4 is a sectional view showing the coated glass sheets and layer of cellulose acetate plastic in proper superimposed relationship but out of contact with one another for sake of clearness;

Fig. 5 illustrates diagrammatically a platen type of press which may be used to effect initial bonding of the laminations;

Fig. 6 is a vertical sectional view of an ordinary autoclave in which final compositing of the laminations can be effected; and Fig. 7 is a sectional view through a sheet of finished laminated safety glass.

While the condensation product of a partially hydrolyzed poly vinyl acetate and formaldehyde may be compounded in a number of different ways, by way of example we suggest that one mole of poly vinyl acetate of the desired viscosity be dissolved in about 500 c. c. of glacial acetic acid. This solution is heated to the boiling point and just as much water is added as can be tolerated without causing precipitation of the resin. Following this step, the mixture is then refluxed and from time to time an analysis is made of the acetyl value in order to determine the extent to which the resin has been hydrolyzed. We prefer that the percent hydrolysis (which can be arrested at any desired point) be carried to within the range of approximately 75% to 95% hydrolysis as this is a satisfactory range for most cellulose acetate plastic sheets; that is, an adhesive made from a poly vinyl acetate which has been hydrolyzed to the extent of 75% to 95% will be adequate for the ordinary commercial cellulose acetate plastic obtainable. Additional water may be added to the mixture during refluxing to accelerate hydrolysis.

The partially hydrolyzed poly vinyl acetate is then recovered in any suitable fashion such as by pouring into water, filtering, and drying, or the acetic acid and water mixture can be distilled off in vacuo.

After recovering the partially hydrolyzed poly vinyl acetate, it is reacted with formaldehyde and the proportions of the mixture may be varied. As an example, one mole of partially hydrolyzed poly vinyl acetate can be reacted with one mole of formaldehyde. However, the exact proportions employed will be dependent not only upon the properties of adhesive desired but upon the degree of partial hydrolysis of the poly vinyl acetate and the composition of the cellulose acetate plastic which is to be bonded to the glass.

The reaction product is then plasticized with such plasticizers as the phthalate esters including dimethyl phthalate, diethyl phthalate, etc.

For use as a spray adhesive coat, 10 parts of the reaction product of the partially hydrolyzed poly vinyl acetate and formaldehyde was dissolved in 200 parts of ethyl acetate (volatile solvent) and 4 parts of dimethyl phthalate (plasticizer). The solution was then sprayed on glass sheets (see sheet 10, Fig. 1) by means of a gun 11 to form the film of adhesive 12. To remove the volatile solvent from the deposit 12 on the glass, the coated glass is subjected to slightly elevated temperatures, and as shown diagrammatically the coated glass sheet 13 in Fig. 3 is placed on a heated platen 14. In this particular operation, the upper platen 15 is not brought into contact with the adhesive layer on the glass, the sole purpose of placing the glass in the platen press being to heat the same and to drive off the volatile solvent. In our work, the coated glass sheet was subjected to a temperature of 250° F. for a few minutes.

After two of such sheets of glass have been treated, a sheet of cellulose acetate plastic 16 is interposed as shown in Fig. 4. The sandwich thus formed is then subjected to an initial pressing which can be accomplished by means of a platen press such as that illustrated diagrammatically by the numeral 17. The sandwich between the platens of the press may be pressed for a period of three minutes at a pressure of 100 pounds per square inch and at a temperature of 250° F.

As most satisfactory results can ordinarily be had by subjecting the sandwiches to hydraulic pressure to effect final compositing, the preliminarily pressed sandwiches 18 are given a final pressing treatment in an autoclave 19. As shown diagrammatically, the sandwiches are carried in a rack 20 adapted to be placed in the autoclave and when closed the temperature and pressure of the fluid 21 is so controlled as to subject the glass to a cycle of about 250 pounds per square inch at a temperature of approximately 300° F. and for a period of about five minutes.

Upon removal from the autoclave, it will be found that the glass and cellulose acetate plastic laminations have been permanently bonded together by means of our improved resin type adhesive. To positively protect the bond between the laminations as well as the cellulose acetate plastic lamination, the marginal portions thereof may be removed to create a channel in which a weather-proofing material can be inserted to form the seal 22 shown in Fig. 7.

In lieu of the spraying method disclosed in Fig. 1, the adhesive can be made of roll coating consistency, and as shown in Fig. 2, a supply of adhesive 23, made by dissolving 10 parts of the reaction product of partially hydrolyzed poly vinyl acetate and formaldehyde resin in 100 parts of carbitol acetate (or a mixture of 50 parts of cellosolve acetate and 50 parts of carbitol acetate) and 4 parts of dimethyl phthalate, is contained in the hopper 24 having the controllable discharge orifice 25. The adhesive flows upon the series of rolls 26 and by passing the sheet of glass 27 between the rolls 28 and 29, the layer of adhesive 30 is deposited upon the upper surface of the glass.

Because of the method of adhesive application, the resin adhesive need not be diluted to the same extent with volatile solvents as in the spray coating method. However, prior to assembly with the other laminations, the adhesive film on the glass should be "dry to touch." The laminating cycle in the pressing apparatus is the same in either case.

As is well known, cellulose acetate plastics vary materially in physical properties depending upon the type of cellulose acetate used in preparing the plastic sheet. This variation is not only effected by the viscosity of the raw cellulose acetate but is influenced by the acetyl content, solubility, etc. as well. Therefore, in producing our adhesive, it should be borne in mind that slight variations may be required in proportions. In all cases, however, the adhesive material should remain compatible with the cellulose acetate plastic as well as adhesive toward glass surfaces. With this control, proper adhesion will be had as well as satisfactory transparency in the finished laminated structure.

We claim:

1. Laminated safety glass comprising two sheets of glass and an interposed layer of transparent cellulose acetate plastic bonded to said glass sheets with a compatible adhesive formed from the condensation products of a partially hydrolyzed polyvinyl acetate and formaldehyde plasticized with an ester of phthalic acid which is compatible with the adhesive and also with the transparent cellulose acetate plastic.

2. Laminated safety glass comprising two sheets of glass and an interposed layer of transparent cellulose acetate plastic bonded to said glass sheets with an adhesive formed from polyvinyl acetate hydrolyzed to the extent of from about 75% to 95% reacted with formaldehyde and mixed with an ester of phthalic acid, said adhesive being compatible with the transparent cellulose acetate plastic and also exhibiting the characteristic of permanent adherence to the glass sheets.

3. Laminated safety glass comprising two sheets of glass and an interposed layer of transparent cellulose acetate plastic bonded to said glass sheets with an adhesive formed from polyvinyl acetate hydrolyzed to the extent of from about 75% to 95% reacted with formaldehyde in the approximate proportions of one mole of partially hydrolyzed polyvinyl acetate to one mole of formaldehyde, and having mixed therewith an ester of phthalic acid plasticizer compatible with both the reaction product and the transparent cellulose acetate plastic.

GEORGE B. WATKINS.
JOSEPH D. RYAN.